US012629943B2

(12) United States Patent
Omura

(10) Patent No.: US 12,629,943 B2
(45) Date of Patent: May 19, 2026

(54) INK STORAGE CONTAINER

(71) Applicant: CANON KABUSHIKI KAISHA, Tokyo (JP)

(72) Inventor: Atsushi Omura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 18/752,506

(22) Filed: Jun. 24, 2024

(65) Prior Publication Data

US 2025/0018720 A1 Jan. 16, 2025

(30) Foreign Application Priority Data

Jul. 11, 2023 (JP) ................................ 2023-113904
Apr. 2, 2024 (JP) ................................ 2024-059410

(51) Int. Cl.
*B41J 2/175* (2006.01)

(52) U.S. Cl.
CPC ....... *B41J 2/17509* (2013.01); *B41J 2/17506* (2013.01); *B41J 2/17513* (2013.01); *B41J 2/17553* (2013.01); *B41J 2/17523* (2013.01)

(58) Field of Classification Search
CPC ................ B41J 2/17509; B41J 2/17506; B41J 2/17513; B41J 2/17553; B41J 2/17523
See application file for complete search history.

(56) References Cited

U.S. PATENT DOCUMENTS

| | | | | | |
|---|---|---|---|---|---|
| 6,079,823 | A * | 6/2000 | Droege | B41J 2/17513 347/85 |
| 2005/0151803 | A1* | 7/2005 | Wilson | B41J 2/17596 347/85 |
| 2005/0151809 | A1* | 7/2005 | Corner | B41J 2/17523 347/86 |
| 2021/0162766 | A1 | 6/2021 | Omura et al. | B41J 2/175 |
| 2023/0074874 | A1 | 3/2023 | Omura | B41J 2/175 |
| 2024/0173986 | A1 | 5/2024 | Omura et al. | B41J 2/175 |

FOREIGN PATENT DOCUMENTS

| | | | | |
|---|---|---|---|---|
| JP | 19970047611 | * | 3/1997 | B65D 83/00 |
| JP | H10-245080 A | | 9/1998 | |

* cited by examiner

*Primary Examiner* — Henok D Legesse
(74) *Attorney, Agent, or Firm* — Venable LLP

(57) ABSTRACT

An ink storage container includes an ink storage unit that stores ink therein and an ink filling unit communicated with the ink storage unit, wherein the ink storage unit is a region where surface free energy of its inner wall is lower than a surface tension of the ink, and the ink filling unit is a region where surface free energy of its inner wall portion that comes into contact with the ink in a case of pouring the ink from the ink storage unit is higher than the surface tension of the ink.

8 Claims, 12 Drawing Sheets

INK STORAGE CONTAINER

BACKGROUND OF THE INVENTION

Cross-Reference to Related Applications

This application claims the benefit of Japanese Patent Application No. 2023-113904, filed Jul. 11, 2023, and No. 2024-059410, filed Apr. 2, 2024, which are hereby incorporated by reference herein in their entirety.

Field of the Invention

The present disclosure relates to an ink storage container.

Description of the Related Art

There has heretofore been known an ink storage container for replenishing ink into an ink tank of an ink ejection apparatus such as an ink jet printer. Functions required for the ink storage container include visibility of contents, ease of pouring ink, and storage reliability (see Japanese Patent Laid-Open No. JP_H10-245080 (hereafter referred to as the '080 document 1), and the like). For example, poor visibility of contents leads to a possibility of a user misunderstanding that there is more ink remaining than there actually is as he/she visually checks an ink storage container that is being used. It is therefore desirable to ensure the transparency of the container so that the contents can be seen at a glance.

At the same time, the ease of pouring is also important. There are various ideas, for example, such as providing a bottle with a tapered nozzle that can be inserted into a tank of a printer, providing a filling pin at the tip of a bottle that can be inserted into a tank of a printer, and providing a pin on the tank side of a printer while providing a bottle with a slot.

The '080 document also mentions the improvement in visibility of the remaining amount and the convenience of filling ink.

A wide variety of inks have recently been developed, and their characteristics also vary. Examples include inks for printing on materials other than paper, some of which are even used for a material such as vinyl chloride that is difficult for ink to penetrate.

In order to ensure print fixability on a material that is difficult for water to penetrate, such inks can use more organic solvents than typical inks intended for printing on paper. Such an ink containing a large amount of organic solvent tends to have a low surface tension. Therefore, in some cases, even in an ink storage container made of a material described in the '080 document, ink may soak and spread on its inner wall.

Also, as for the ease of pouring, a bellows structure described in the '080 document is a movable part, and thus may wear out and break if used repeatedly.

SUMMARY OF THE INVENTION

The present disclosure provides an ink storage container having an ink storage unit that stores ink therein, and an ink filling unit communicated with the ink storage unit, wherein the ink storage unit is a region where surface free energy of its inner wall is lower than a surface tension of the ink, and the ink filling unit is a region where surface free energy of its inner wall portion that comes into contact with the ink in a case of pouring the ink from the ink storage unit is higher than the surface tension of the ink.

Further features of the present invention will become apparent from the following description of exemplary embodiments with reference to the attached drawings.

DESCRIPTION OF THE EMBODIMENTS

Preferred exemplary embodiments of the present disclosure will be described. Note that, in all of the following exemplary embodiments, shapes and structures are not limited to those exemplified as the exemplary embodiments, and the designer may arbitrarily change, add or omit them within the scope of the claims.

Exemplary Embodiment 1

(Ink Ejection Apparatus)

Figure 1A:
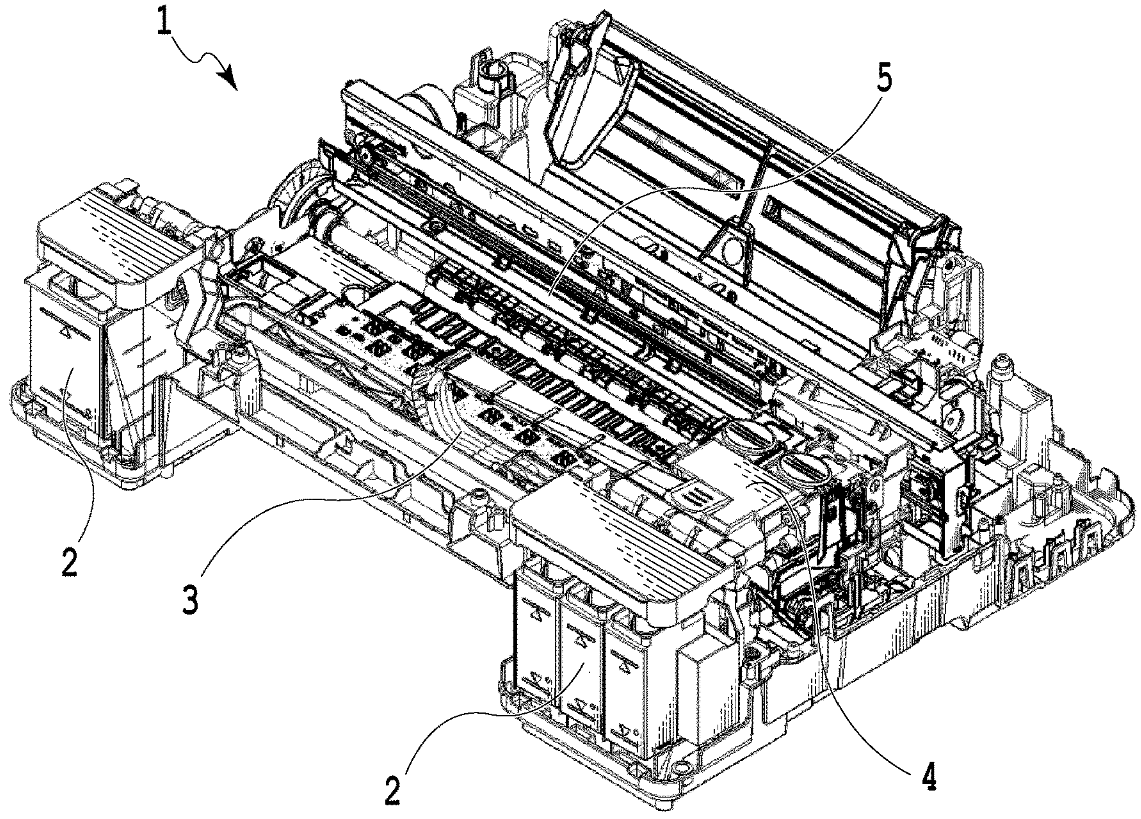
FIG. 1A is an external appearance of an ink jet printer.

First, a configuration of an ink ejection apparatus to which an ink storage container according to the present embodiment can be applied will be described. In the present embodiment, the ink ejection apparatus will be described as an ink jet printer, but the ink storage container according to the present embodiment may be used in other ink ejection apparatuses. FIG. 1A shows a general ink jet printer 1. Reference numeral 2 denotes an ink tank provided in the printer, from which ink is supplied through a tube 3 to an ink jet print head (not shown) stored in 4 to perform printing. Hereafter, reference numeral 4 will be referred to as a head unit, and the ink jet print head will be referred to as a print head.

The ink jet printer 1 repeats reciprocating of the print head (main scanning) and conveyance of printing sheets such as general printing paper, special paper, and OHP film at a predetermined pitch (sub scanning). The ink jet printer 1 according to the present embodiment is a serial ink jet printer that forms characters, symbols, images, and the like by selectively ejecting ink as an example from the print head and depositing the ink on the printing sheet while synchronizing with the main scanning and sub scanning.

In FIG. 1A, the head unit 4 is slidably supported by a guide rail 5, and is reciprocated along the guide rail 5 by a driving unit such as a motor (not shown). The printing sheet is conveyed by a conveyance roller in a direction intersecting a moving direction of the head unit 4, facing an ink ejection surface of the print head and maintaining a constant distance from the ink ejection surface.

The print head has a plurality of ejection port arrays, each of which ejects ink of a different color. The print head is equipped with a printing element unit. In the printing element unit, a plurality of electrothermal conversion elements (heaters) or piezoelectric elements are arranged as ejection energy generating elements for ejecting ink. The ejection energy generating element ejects ink supplied through an ink supply path (the tube 3, and the like) from the ejection port. In a case of using the electrothermal conversion element as the ejection energy generating element, for example, the heater generates heat to generate bubbles in the ink, and this bubble generating energy is used to eject the ink from the ejection port.

Figure 1B:
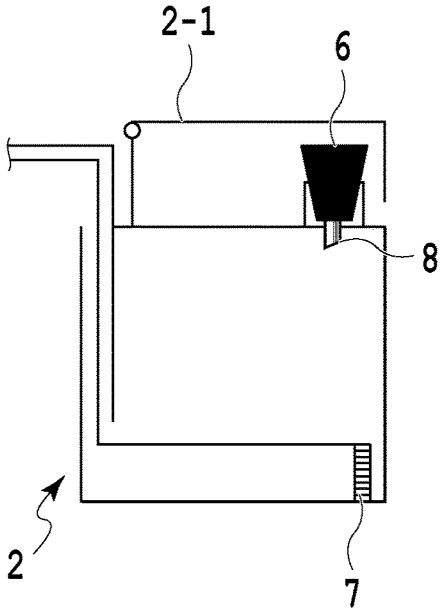
FIG. 1B is a schematic diagram of an ink tank.
Figure 1C:
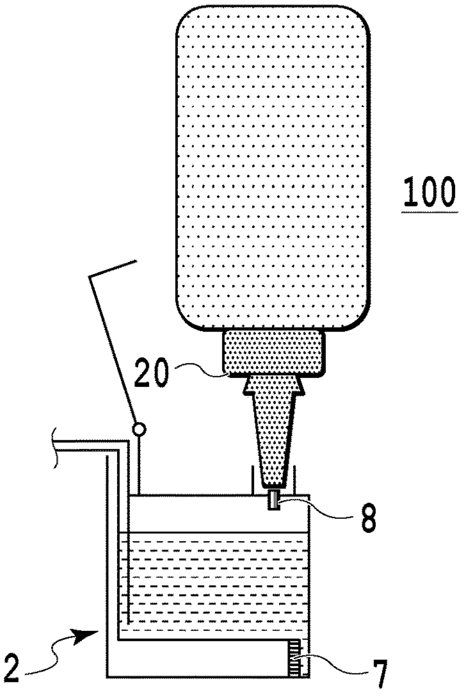
FIG. 1C is a diagram showing how ink is filled into the ink tank from an ink storage container according to an exemplary embodiment of the present disclosure.

FIG. 1B shows a simplified cross section of the ink tank 2. After opening a tank cover 2-1 and removing a plug 6, a user inserts an ink filling unit 20 of the ink storage container into a joint 8 as shown in FIG. 1C, thereby filling ink into the ink tank 2. The user can generally replenish an arbitrary amount of ink in from the ink storage container at an arbitrary timing as the ink in the ink tank 2 decreases.

The ink tank 2 has a gas-liquid exchange membrane 7, which can always keep the pressure inside the ink tank 2 equal to atmospheric pressure even if the ink in the tank is consumed with the plug 6 attached to the tank.

(Ink Storage Container)

Figure 2A:
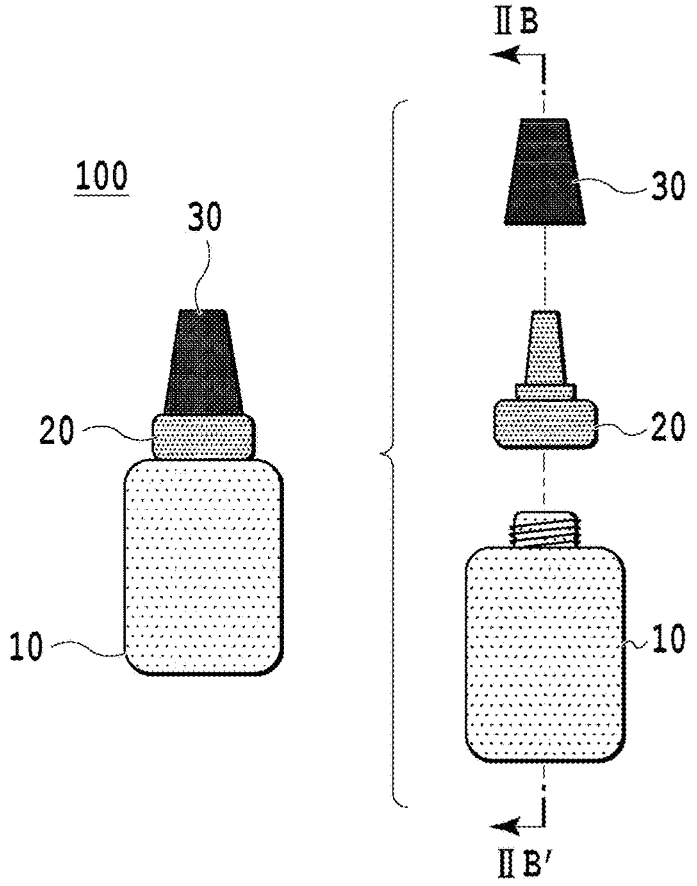
FIG. 2A shows an ink storage container suitable for the present disclosure, and an exploded view thereof.

Next, a configuration of an ink storage container 100 will be described. FIG. 2A shows an ink storage container suitable for the present disclosure, and an exploded view thereof. The ink storage container 100 is a storage container for filling ink into the ink tank 2. The ink storage container 100 has an ink storage unit 10 that can accommodate and store ink during storage and distribution, and the ink filling unit 20 that protrudes from the ink storage unit 10 and serves as an ink pouring unit. The ink storage unit 10 and the ink filling unit 20 are in fluid communication, so that in a case of filling ink into the ink tank 2 as shown in FIG. 1C, the ink flows from the ink storage unit 10 to the ink tank 2 through the ink filling unit 20. In another exemplary embodiment, the ink storage container 100 may be used to replenish ink to an ink ejection apparatus other than an ink jet printer.

The ink storage container 100 may have a cap unit 30 to prevent ink from leaking or drying. A packing, or the like (not shown), may also be sandwiched, if necessary, between the ink storage unit 10 and the ink filling unit 20 to improve their sealability.

In the present embodiment, a description is given of an example where the ink storage unit 10 and the ink filling unit 20 are plugged with a screw structure, and the cap unit 30 and the ink filling unit 20 are plugged by fitting, but the present disclosure is not limited thereto and any form or combination may be used as long as the ink does not spill.

Figure 2B:
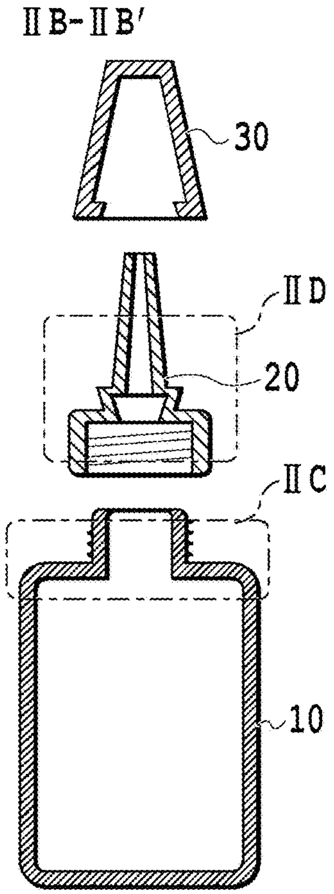
FIG. 2B is a cross-sectional view taken along line IIB-IIB' of the ink storage container suitable for the present disclosure.
Figure 2C:
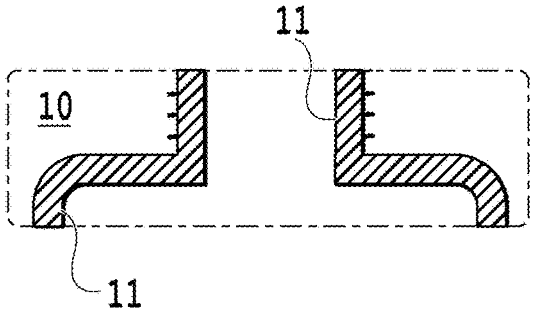
FIG. 2C is a partially enlarged view of an ink storage unit in FIG. 2B.
Figure 2D:
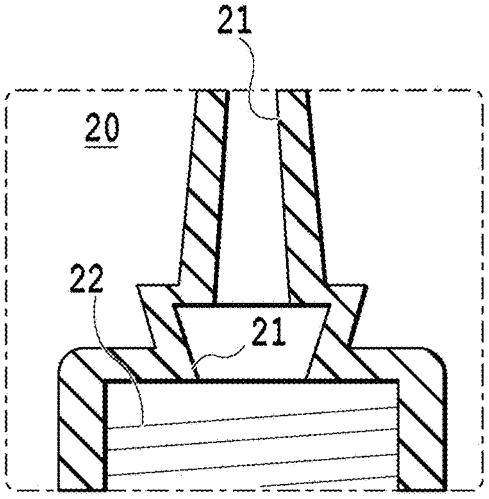
FIG. 2D is a partially enlarged view of an ink filling unit in FIG. 2B.

FIG. 2B shows a cross section taken along IIB-IIB' in FIG. 2A. FIG. 2C shows a partially enlarged view of the ink storage unit 10 in FIG. 2B. FIG. 2D shows a partially enlarged view of the ink filling unit 20 in FIG. 2B.

In the present embodiment, the entire inner surface area of the ink storage unit 10 is referred to as an ink storage unit inner wall, and is denoted by reference numeral 11 in FIG. 2C. Similarly, the entire inner area of the ink filling unit 20 that can come into contact with ink during ink filling is referred to as an ink filling unit inner wall, and is denoted by reference numeral 21 in FIG. 2D. In the shape of the ink filling unit 20 shown in FIG. 2, a threaded part 22 does not touch ink during ink filling and is thus not included in the ink filling unit inner wall 21.

In the present embodiment, the surface free energy of the ink storage unit inner wall 11 is lower than the surface tension of the ink accommodated therein. On the other hand, the surface free energy of the ink filling unit inner wall 21 is higher than the surface tension of the ink accommodated therein. As for the threaded part 22, the surface free energy is not particularly specified, but may be the same as or different from that of the ink filling unit inner wall 21.

In a case of using ink with a surface tension of about 25 mN/m, for example, it is preferable that the ink storage unit inner wall 11 is made of a material whose surface free energy is less than or equal to about 18 mN/m, and that the ink filling unit inner wall 21 is made of a material whose surface free energy is more than or equal to about 29 mN/m.

Here, the relationship between the surface tension of ink and the surface free energy of a solid in contact with the ink will be described. FIG. 3 shows how the state of an ink droplet changes depending on the relationship between the surface tension of the ink and the surface free energy of the solid in contact with the ink in a case when the ink droplet, which is so minute that the influence of gravity can be ignored, is dropped on the surface of a certain solid.

Figure 3A:
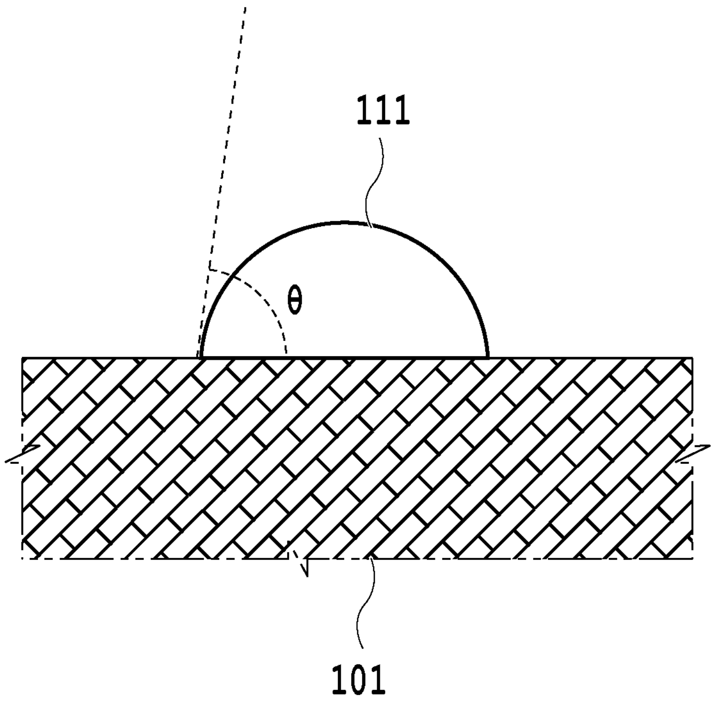
FIG. 3A shows a state of an ink droplet in a case when surface free energy of a substrate 101<surface tension of an ink 111.

FIG. 3A shows a shape of an ink droplet in a case when a substrate 101 has a surface free energy smaller than a surface tension of an ink droplet 111, and $\theta$ is defined as the angle between the tangent of the ink droplet near the solid surface and the solid. This $\theta$ is what is called a contact angle, which is defined in the present disclosure by a measured value of a dynamic receding contact angle $\theta$ with respect to the ink, using a micro contact angle meter (product name: DropMeasure, manufactured by Microjet Co., Ltd.). In the present disclosure, a state where the angle $\theta$ is more than or equal to about seventy degrees is defined as a state where ink droplets aggregate easily (liquid repellency). If the angle is more than or equal to, preferably, ninety degrees, the ink droplets tend to aggregate more easily.

Figure 3B:
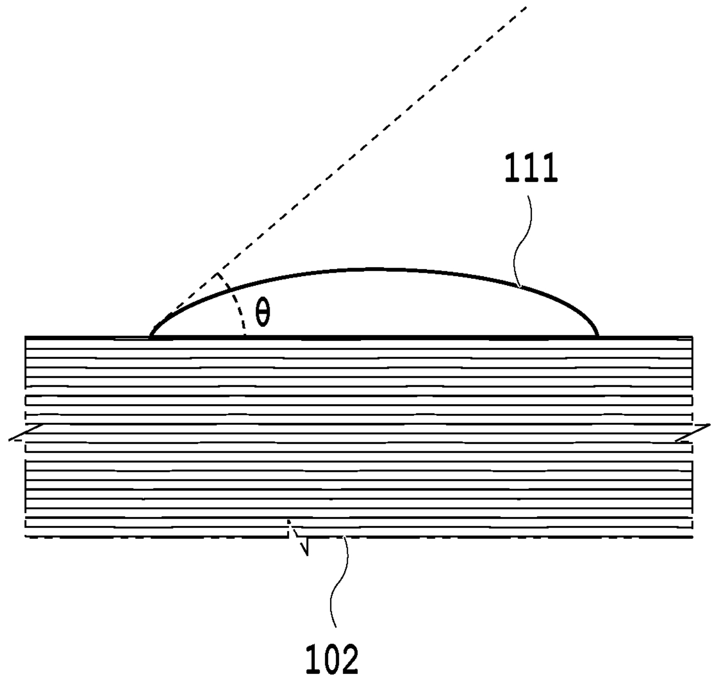
FIG. 3B shows a state of the ink droplet in a case when the surface tension of the ink 111<surface free energy of a substrate 102.

FIG. 3B is an image diagram of a state of an ink droplet in a case when a surface free energy of a substrate 102 is approximately equal to or more than the surface tension of the ink droplet 111. This state refers to, in the present disclosure, a state where $\theta$ is less than about seventy degrees, and is defined as a state where the ink easily soaks and spreads (lyophilic property).

For example, if the ink dries as it soaks and spreads on a wall surface 11 of the ink storage unit 10, ink components remain on the wall surface, leading to poor visibility. Therefore, it is preferable for the ink to show a tendency of aggregating in the ink storage unit 10, so that the user can visually confirm the contents accurately. During ink filling, on the other hand, the ink flows along the ink filling unit inner wall 21 into the ink tank. Therefore, the filling is facilitated if the ink soaks and spreads as much as possible.

The surface free energy of a solid is generally defined as a value measured using a method generally called an OWRK method. The OWRK method is a method wherein two or more types of ink reagents with known physical properties are used to measure the contact angle of each reagent and the solid and calculate the surface free energy from the physical property values of the ink and the measured value of the contact angle.

The surface tension of the ink is defined as a value measured using the Wilhelmy method (also known as the plate method). The Wilhelmy method is a method of calculating surface tension by inserting a solid platinum plate into ink to be measured and measuring the force generated in the direction in which the ink pulls the plate.

Furthermore, there are a variety of ways, in general, for adjusting the surface tension of ink, but the present disclosure does not limit the adjustment method. For example, there is a method of adjusting the surface tension by adjusting the amount of surfactant in ink. Examples of the surfactant include acetylene glycol-based surfactant, polyoxyethylene alkyl ether, and the like.

In the present embodiment, the ink surface tension (about 25 mN/m) exceeds the surface free energy (about 18 mN/m) of the ink storage unit inner wall 11. This increases the aggregating force of the ink on the inner wall surface of the ink storage unit 10, preventing the ink from soaking and spreading. It is important that the surface free energy of the ink storage unit inner wall 11 is lower than the surface tension of the ink. It is preferable that the materials are selected based on the condition as described above that the surface free energy of the ink storage unit inner wall 11 is less than the surface tension of the ink by 5 mN/m or more.

The surface free energy (about 29 mN/m) of the ink filling unit inner wall 21 exceeds the ink surface tension (about 25 mN/m), and thus the ink tends to soak and to spread.

Therefore, in the present embodiment, it is possible to facilitate smooth filling of ink into the printer while maintaining good visibility by preventing the ink from soaking and spreading on the ink storage unit inner wall 11. As the ink can be smoothly filled into the printer while preventing the ink from soaking and spreading on the ink storage unit inner wall 11, the amount of ink remaining inside the ink storage container 100 that is used and discarded or reused is reduced. That is, the amount of ink to be discarded while remaining in the ink storage container 100 can be reduced. Furthermore, also in a case of cleaning the inside of the used ink storage container 100 and reusing the ink storage container 100, if the amount of ink remaining in the ink storage container 100 is reduced, the amount of liquid such as water required for cleaning can also be reduced. This can reduce the cost of reusing the ink storage container 100, thus promoting the reuse of the ink storage container 100. That is, the technology described in the present specification can contribute to the realization of a sustainable society such as a decarbonized, recycling society.

The materials forming the ink storage unit 10 and the ink filling unit 20 may be any material that can satisfy the surface free energy described above.

Figure 4A:
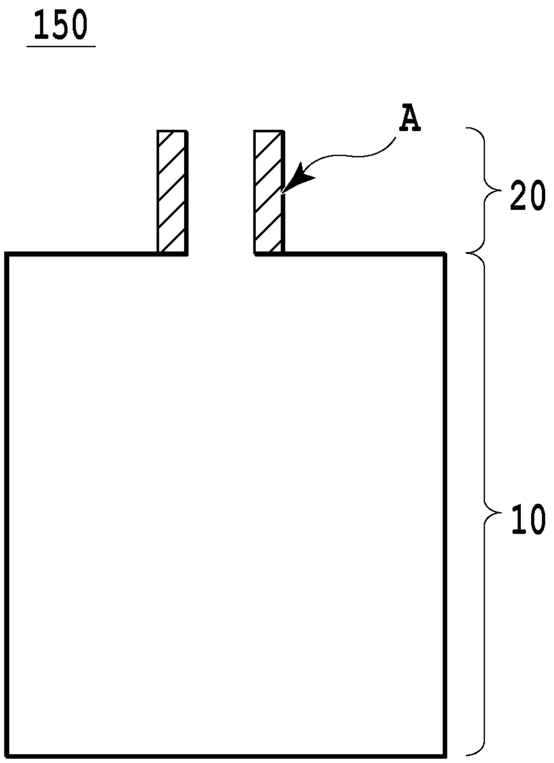
FIG. 4A is a schematic diagram showing an ink storage container 150.
Figure 4B:
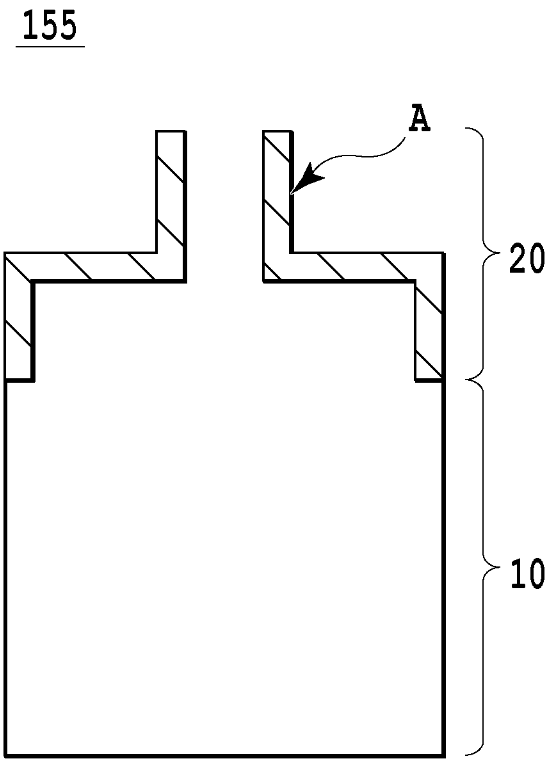
FIG. 4B is a schematic diagram showing an ink storage container 155.

Examples of the material with the surface free energy of about 18 mN/m include a resin having a perfluoroalkyl group in its molecular structure, such as PTFE. The perfluoroalkyl group, also called a fluoroalkyl carbide group, has all hydrogen atoms in the alkyl chain replaced with fluorine atoms, and is characterized by extremely small intermolecular force. Examples of the material with the surface free energy of about 29 mN/m include PP. These materials may be surface-modified using ways such as plasma irradiation, light irradiation, a surface modifier, or a coating. In an ink storage container made of a single material, for example, an area A having a surface free energy higher than the surface tension of ink stored in a spout portion may be provided as the ink filling unit 20. In an ink storage container 150 shown in FIG. 4A, the area A is provided at the neck of a bottle, and thus the neck serves as the ink filling unit 20. In an ink storage container 155 shown in FIG. 4B, on the other hand, the area A is provided not only at the neck of the bottle but also at the shoulder, and thus the neck and the shoulder serve as the ink filling unit 20.

It is preferable that the thickness of the ink storage container 100 according to the present embodiment is adjusted so that a haze value of the substrate forming the ink storage unit 10 is 30% or less, more preferably 10% or less.

The haze value is defined as a value measured by a method based on JIS K7136. The haze value can be obtained by cutting a test piece into an appropriate size (for example, 3×3 cm) and fixing it on a movable measuring stand, and by using Haze Meter NDH4000 manufactured by Nippon Denshoku Industries Co., Ltd. as a measuring instrument. This haze value is a value related to the visibility of contents, indicating the degree of scattering as light passes through a certain member. As for the principles of measuring a haze value, light is made incident on the test piece in a straight line, and scattered light is detected using a photodetector installed at a position away from the line of incidence of the light. The degree of scattering is defined by measuring the proportion of the scattered light. Even for the same substance, the thicker the thickness through which light passes, the higher the probability of collision with molecules, and the higher the haze value tends to be.

Figure 5:
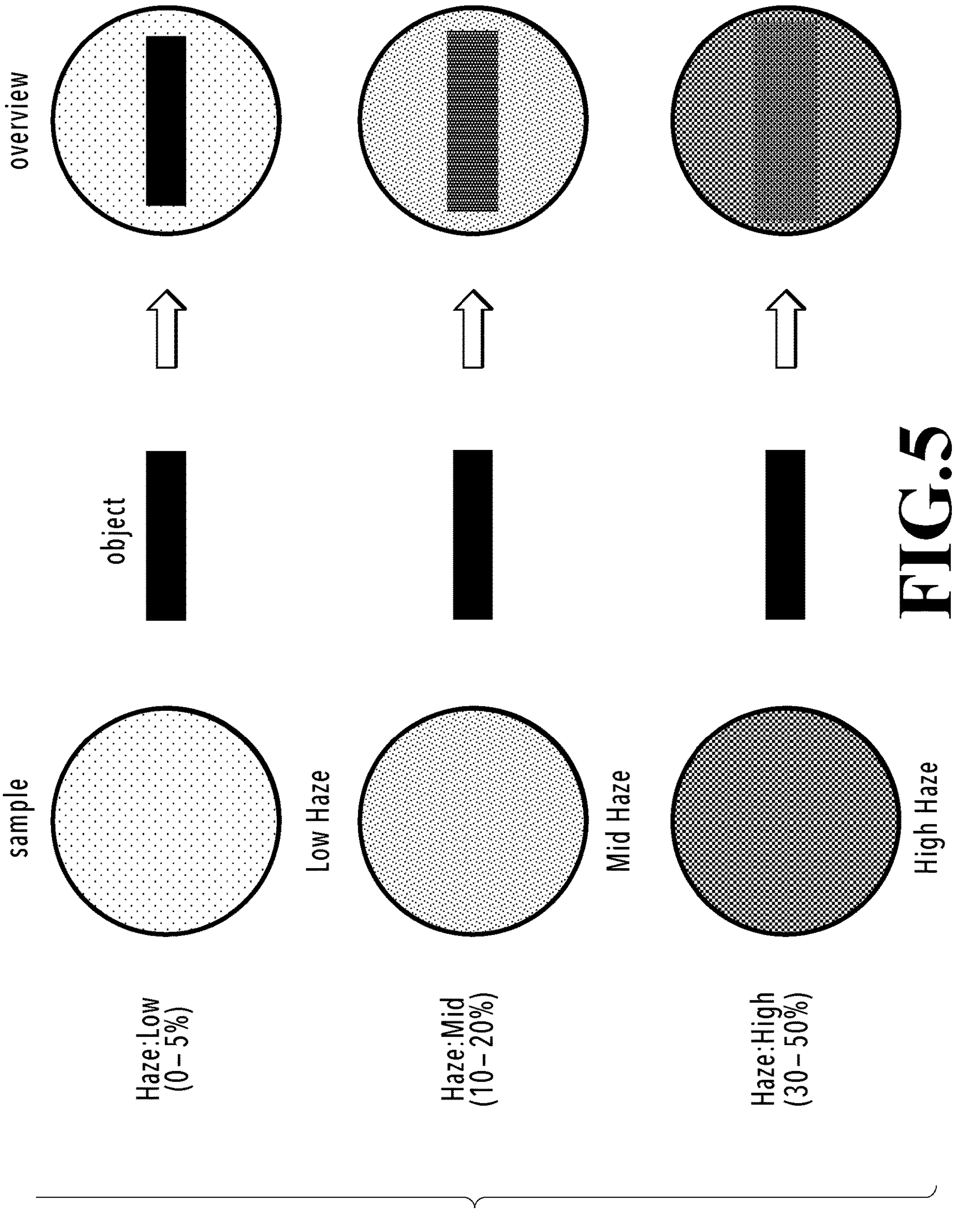
FIG. 5 is a schematic diagram showing the relationship between a haze value and visibility.

FIG. 5 is a schematic diagram showing the relationship between the haze value and visibility. In a case of the ink storage container 100, as illustrated in FIG. 5, if the container has a high haze value, the interface of the contents appears blurred, or in some cases, the interface is not accurately recognizable. Specifically, it is preferable that the haze value of the storage unit is 30% or less, so that the amount of contents can be accurately recognized. It is more preferable that the haze value is 10% or less, so that the visibility can be expected to the extent that the color of the contents can be roughly recognized.

Exemplary Embodiment 2

As a second exemplary embodiment, an example is given where an ink having a surface tension of about 35 mN/m is used, the ink storage unit inner wall 11 is made of a resin having a surface free energy of about 29 mN/m or less, and the ink filling unit inner wall 21 is made of a resin having a surface free energy of about 42 mN/m. Furthermore, the thickness is adjusted so that the haze value of the ink storage unit 10 is 30% or less. In exemplary embodiment 2, again, the relationship between the surface free energy of the ink storage unit inner wall 11, the surface tension of the stored ink, and the surface free energy of the ink filling unit inner wall 21 is as follows: ink storage unit inner wall 11<ink<ink filling unit inner wall 21.

Examples of the resin with the surface free energy of about 29 mN/m include PP. Examples of the resin with the surface free energy of about 42 mN/m include ABS resin.

The major difference between Exemplary Embodiment 1 and Exemplary Embodiment 2 is the surface tension of the stored ink, which is 35 mN/m in Exemplary Embodiment 2 that is higher than 25 mN/m in Exemplary Embodiment 1. Therefore, in a case when the ink of Exemplary Embodiment 1 and the ink of Exemplary Embodiment 2 are dropped onto PP whose surface free energy is about 29 mN/m, the ink of Exemplary Embodiment 1 tends to soak and spread, while the ink of Exemplary Embodiment 2 tends to aggregate.

Although PP is described as a material suitable for the filling unit in Exemplary Embodiment 1, PP is more suitable as a material for the storage unit than for the filling unit for the ink of Exemplary Embodiment 2. Even the same resin material thus has a preferred form that differs depending on the physical properties of the stored ink.

As a matter of course, using PTFE for the storage unit in Exemplary Embodiment 2 as in Exemplary Embodiment 1 does not contradict the intention of the present disclosure, and there is nothing wrong with using ABS resin for the filling unit in Exemplary Embodiment 1. Furthermore, metal such as SUS may be used for the filling unit. The surface free energy of the metal is generally 400 mN/m or more, and thus ink tends to soak and spread.

The materials that can be used for the ink storage container 100 according to the present disclosure, including substances not described in the exemplary embodiments, can be used in any combination as appropriate within the scope of the claims of the present disclosure.

Exemplary Embodiment 3

In the ink storage container according to the present disclosure, the ink storage unit 10 and the ink filling unit 20 may be composed of a plurality of members. In that case, as in Exemplary Embodiments 1 and 2, the relationship between the surface free energy of the ink storage unit inner wall 11, the surface tension of the stored ink, and the surface free energy of the ink filling unit inner wall 21 is as follows: ink storage unit inner wall 11<ink<ink filling unit inner wall 21. Even if the ink storage container is composed of a plurality of members, it is preferable that the haze value of the ink storage container is 30% or less.

Figure 6C:
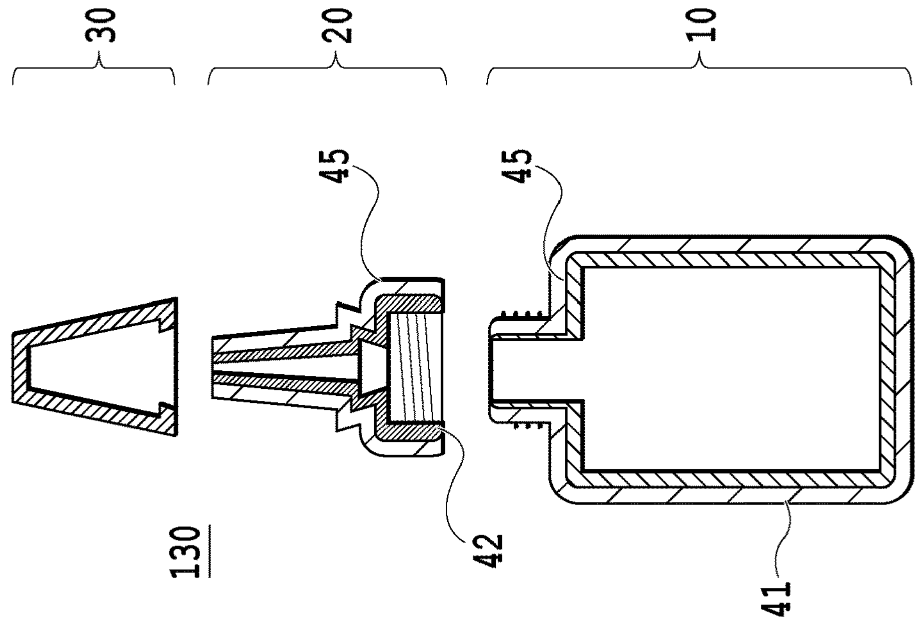
FIG. 6C is a cross-sectional view of an ink storage container according to Exemplary Embodiment 3.
Figure 6B:
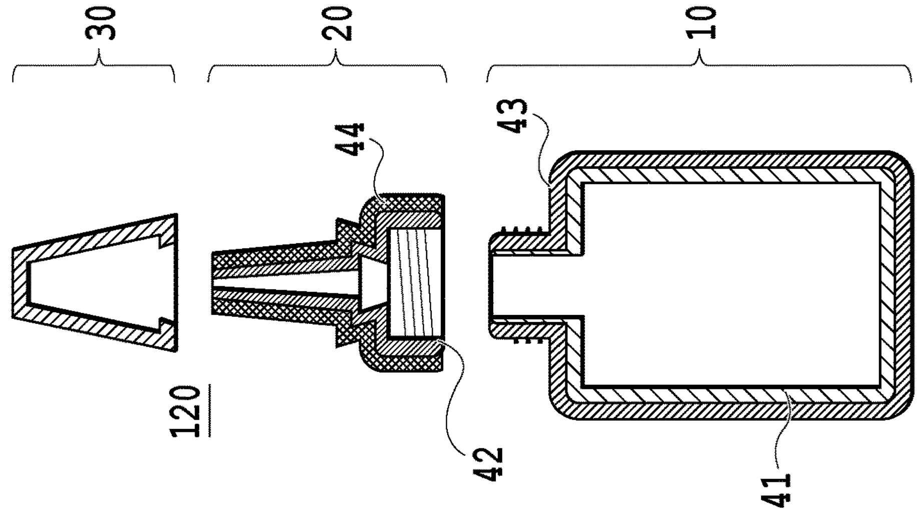
FIG. 6B is a cross-sectional view of an ink storage container according to Exemplary Embodiment 3.
Figure 6A:
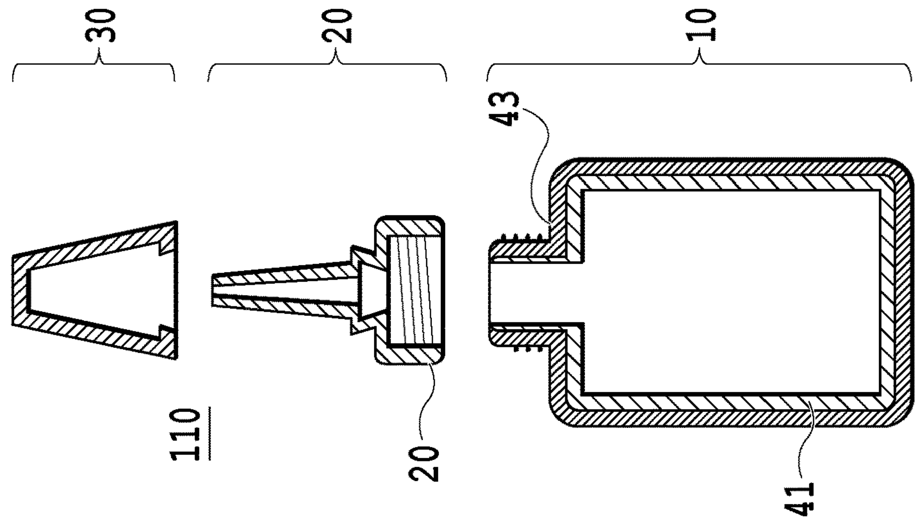
FIG. 6A is a cross-sectional view of an ink storage container according to Exemplary Embodiment 3.

In an ink storage container 110 shown in FIG. 6A, an ink storage unit 10 has an inner storage part 41 and an outer storage part 43. This leads to an advantage that the inside and outside of the ink storage unit 10 can have different functions.

For example, a combination of using a material with low surface free energy for the inner storage part 41 and a material with excellent impact resistance for the outer storage part 43 is conceivable. In this case, even if there are concerns about the impact resistance of a member to be used for the inner storage part 41, a reinforcing effect can be expected from the member to be used for the outer storage part 43. There is also an advantage that the surface free energy is not a concern because the member to be used for the outer storage part 43 does not come into direct contact with ink.

In an ink storage container 120 shown in FIG. 6B, an ink storage unit 10 has an inner storage part 41 and an outer storage part 43, and an ink filling unit 20 has an inner filling part 42 and an outer filling part 44. The ink storage unit 10 may have the same configuration as that shown in FIG. 6A.

As one of the combinations of the ink filling unit 20 of the ink storage container 120, an example is given where a substance with high surface free energy is used for the inner filling part 42 and a porous member into which ink easily permeates is used for the outer filling part 44. In such a structure, the surface free energy of the inner filling part 42 is increased to maintain the ease of pouring ink. At the same time, such a structure can expect an effect of minimizing the area of contamination by the porous material absorbing ink running down and leaking from the tip of the filling part as the user finishes pouring the ink into the ink tank 2.

An ink storage container 130 shown in FIG. 6C has a configuration in which an ink storage unit 10 and an ink filling unit 20 are each covered with a common member 45 made of a common material. In the case of such a structure, impact resistance can be ensured by the common member 45 while using materials with suitable surface free energy for the inner storage part 41 and the inner filling part 42. This makes it possible to divide the functions while reducing the types of materials used for the ink storage container 100.

There are various manufacturing methods and techniques that can be used to realize the configuration of the present embodiment, but the method is not limited. The components may be individually created and fitted or combined, regardless of whether they are used for the inner or outer members. Further, a film may be formed by coating, or the like, and a method of attaching a separately prepared film or thin film is also included. Examples of a coating method include a method wherein a solvent having a desired resin dissolved therein is sprayed or applied, and then the solvent is evaporated.

Such a coating method and the method of applying a film or a thin film have the advantage of reducing the thicknesses of the members, thus expecting an effect of reducing the material cost. As for the ink storage unit 10, a thinner member has the advantage of making it easier to set a lower haze value. The reason why a thinner member makes it possible to set a lower haze value is as already described in Exemplary Embodiment 1.

(Valve Mechanism)

The ink storage container according to the present embodiment may further have a valve mechanism in the ink filling unit 20.

FIG. 7 shows an ink storage container 200 in which a valve mechanism with a valve spring structure is provided in the ink filling unit 20. Inside the ink filling unit 20, there are provided a seal 24 having an opening, a valve 25 that opens and closes the opening of the seal 24, a spring 26 that biases the valve 25, and a holder 27 that fixes the spring 26.

In a case of supplying ink from the ink storage container 200 to the ink tank 2, a communication channel of the ink tank 2 is inserted into the opening of the ink filling unit 20 of the ink storage container 200. The ink filling unit 20 of the ink storage container 200 is provided with a recess that engages with the protrusion of a socket of the ink jet printer 1. The ink storage container 200 is positioned as the communication channel is inserted into the opening of the ink filling unit 20. The ink in the ink storage container 200 is supplied to a storage chamber of the ink tank main body through the communication channel due to the water head difference.

Figure 7A:
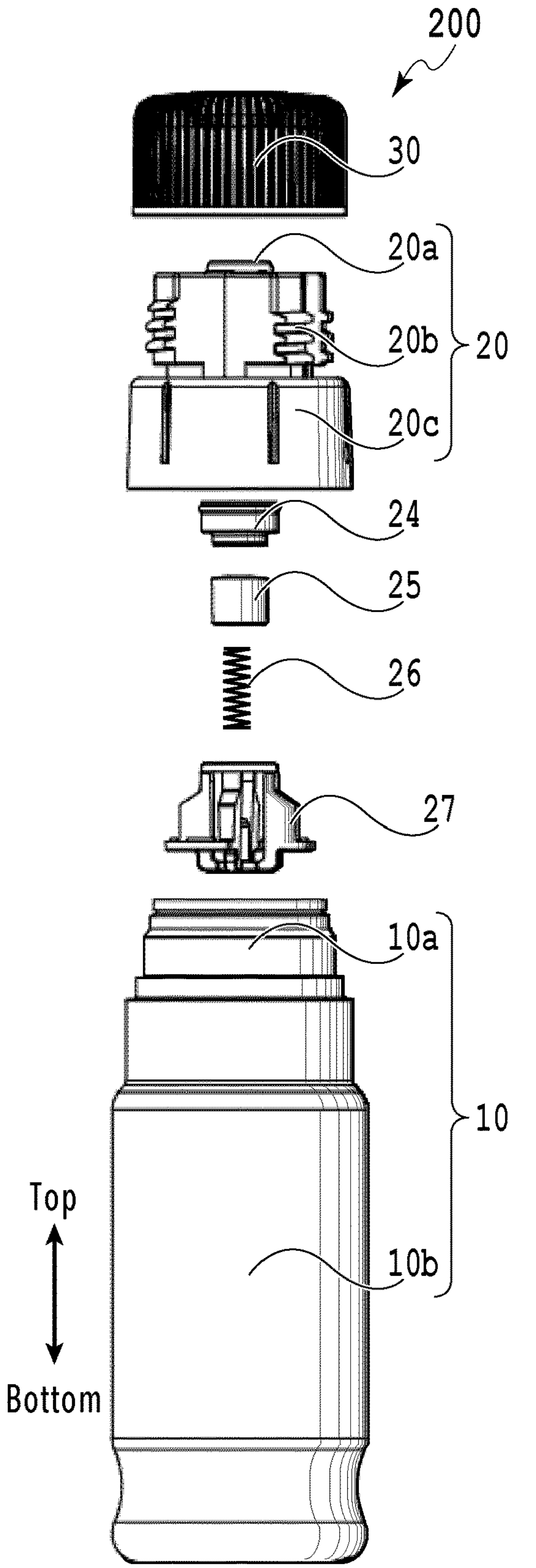
FIG. 7A is an exploded view of an ink storage container 200.
Figure 7B:
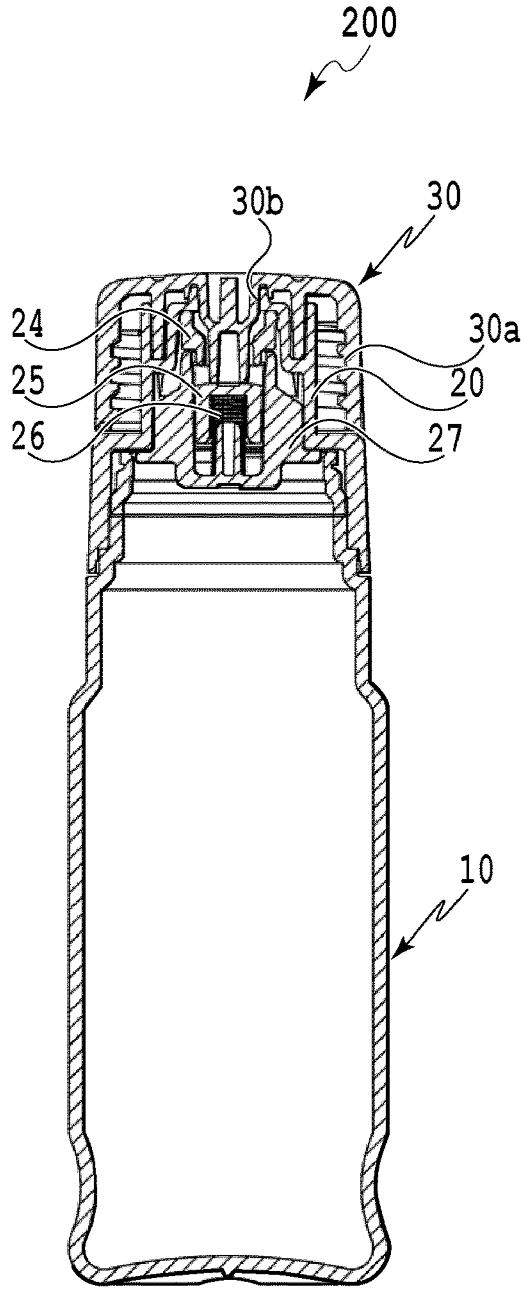
FIG. 7B is a cross-sectional view of the ink storage container 200.

The ink storage container 200 has two sealable parts (hereafter referred to as sealing parts). FIG. 8 is a diagram illustrating sealing parts of the ink storage container 200. In a first sealing part, sealing is performed by fitting the cap unit 30 and the ink filling unit 20, as shown in FIG. 7A. In a second sealing part, sealing is performed by the valve structure inside the ink filling unit 20, as shown in FIG. 7B. Each sealing part will be described below.

Figure 8A:
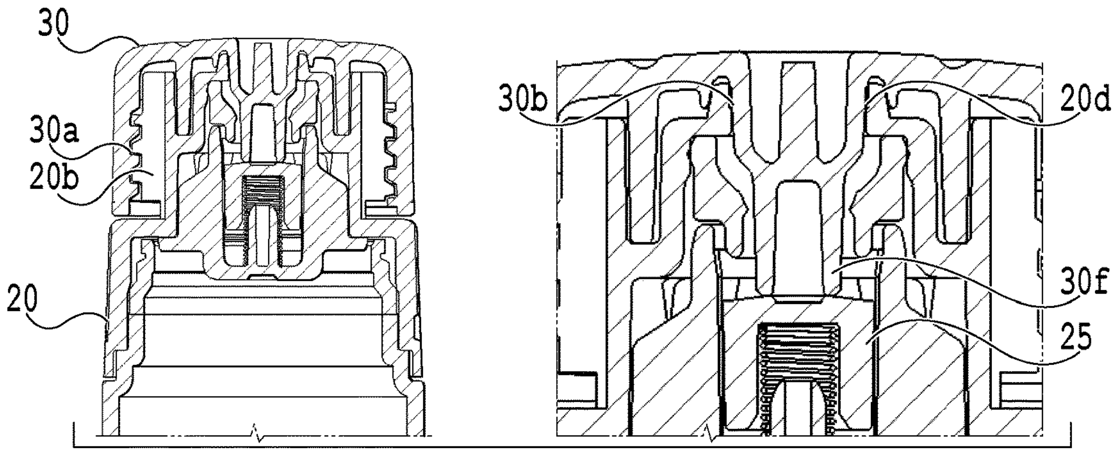
FIG. 8A is a cross-sectional view and an enlarged view of an upper part of the ink storage container 200 with its cap unit 30 attached to an ink filling unit 20.

The first sealing part will be described with reference to FIG. 8A. FIG. 8A is a cross-sectional view of the upper part of the ink storage container 200 with the cap unit 30 attached to the ink filling unit 20, and also shows an enlarged view thereof. By attaching the cap unit 30 to the ink filling unit 20, the first sealing part fits a cap sealing part 30*b* of the cap unit 30 and a sealing part 20*d*, which is a part of a spout 10*a* of the ink filling unit 20. Examples of a method for attaching the cap unit 30 to the ink filling unit 20 include screwing the ink filling unit 20 and the cap unit 30 together. Specifically, as shown in FIGS. 7A, 7B, and 8A, a screw part 20*b* having a male screw structure formed on the outside of the ink filling unit 20 and a cap screw part 30*a* having a female screw structure formed inside the lower part of the cap unit 30 are used to screw the both together. Conversely, the cap unit 30 having a male screw part and the ink filling unit 20 having a female screw part may be used.

Figure 8B:
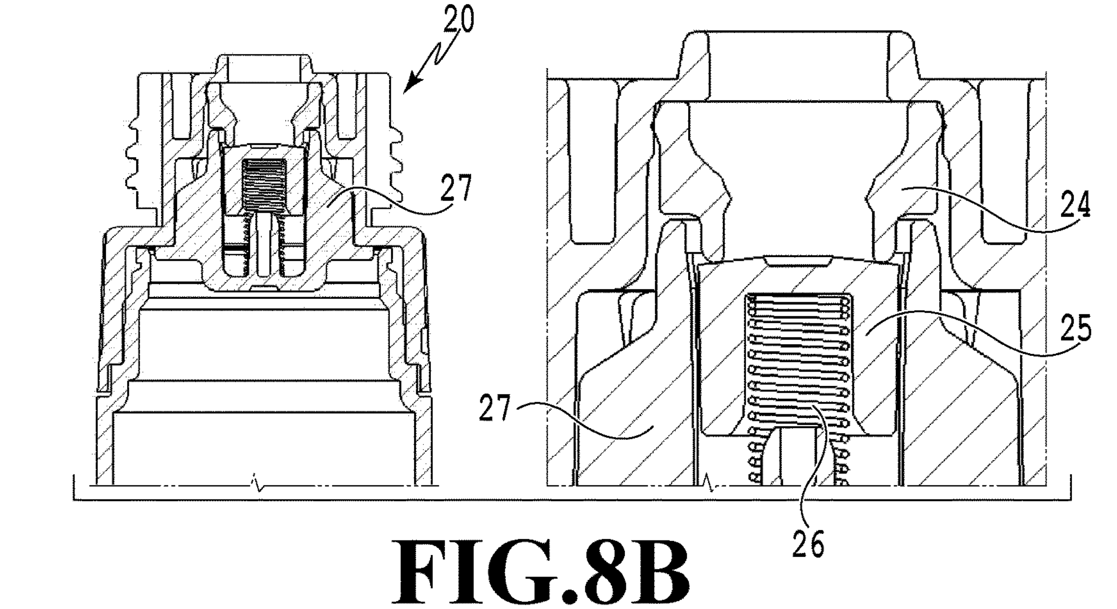
FIG. 8B is a cross-sectional view and an enlarged view of the upper part of the ink storage container 200 without its cap unit 30 attached.

The second sealing part will be described with reference to FIG. 8B. FIG. 8B is a cross-sectional view of the upper part of the ink storage container 200 without the cap unit 30 attached, and also shows an enlarged view thereof. The second sealing part is a part of a liquid stop valve structure (valve structure) provided inside the ink filling unit 20 of the ink storage container 200. As shown in FIG. 8B, the ink filling unit 20 is provided with a seal 24, which is an orifice part having an opening at its tip (upper end) into which a communication channel is inserted. A gap between the seal 24 and the valve 25 is closed by biasing the valve 25, which is the valve body of the liquid stop valve, toward the opening side by a spring 26, and the ink storage container 200 is sealed. In the present embodiment, the spring 26 is used as a biasing mechanism, and the spring 26 is held by a holder 27 fixed in the internal space of the ink filling unit 20. The seal 24 is made of a flexible member such as rubber or elastomer.

With this liquid stop valve structure, the valve 25 is biased against the opening of the seal 24 by the spring 26, so that the inside of the ink storage container 200 can be kept sealed even if the cap unit 30 is removed from the ink filling unit 20. In a case of supplying ink from the ink storage container 200 to the ink tank 2, the communication channel is inserted into the ink filling unit 20 through the opening of the seal 24, and the valve 25 is opened. As described above, the ink in the ink storage container 200 is supplied to the storage chamber of the ink tank main body through the communication channel due to the water head difference.

In the present embodiment, these two sealing parts are configured to be temporarily opened at the same time as the cap unit 30 is opened from the ink filling unit 20 and as the cap unit 30 is closed with respect to the ink filling unit 20. The inside of the ink storage container 200 is thus communicated with the atmosphere, and the inner pressure of the ink storage container 200 can be set equal to the outside pressure. This will be described in detail below.

First, in a closed state of the cap unit 30, the first sealing part is in a sealed state, as shown in FIG. 8A. In the second sealing part, on the other hand, a protrusion 30*f* provided in the cap unit 30 is pushed in a direction opposite to the biasing direction of the valve 25 as the cap unit 30 is closed, thus forming a gap between the seal 24 and the valve 25. In FIG. 8A, the second sealing part is thus set in an open state. That is, in the closed state of the cap unit 30, the first sealing part is sealed and the second sealing part is opened.

Figure 8C:
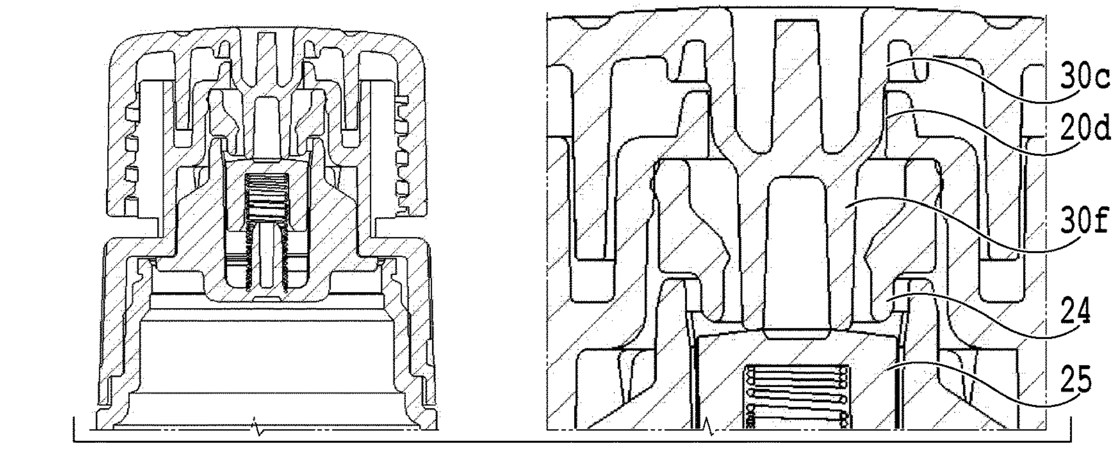
FIG. 8C is a cross-sectional view and an enlarged view of the upper part of the ink storage container 200 in a state where the cap unit 30 starts to open from the state shown in FIG. 8A where the cap unit 30 is attached to the ink filling unit 20.

FIG. 8C is a cross-sectional view of the upper part of the ink storage container 200 in a state where the cap unit 30 starts to open from the state shown in FIG. 8A where the cap unit 30 is attached to the ink filling unit 20, and also shows an enlarged view thereof. The cap unit 30 moves upward from the closed state shown in FIG. 8A as it is opened as shown in FIG. 8C. As the cap unit 30 moves, the cap sealing part 30*b* and the sealing part 20*d* are separated to open the first sealing part. As the first sealing part is opened, the protrusion 30*f* provided in the cap unit 30 is still in the position where the valve 25 is pushed in, as shown in FIG. 8C. In other words, the second sealing part remains open. Therefore, as shown in FIG. 8C, the second sealing part can also be opened at the same time as the first sealing part is opened. As the cap unit 30 then further moves upward, the protrusion 30*f* is completely separated from the valve 25 as the cap unit 30 moves, thus sealing the second sealing part, as shown in FIG. 8B. As the cap unit 30 is closed from its open state, the second sealing part is opened by the protrusion 30*f* of the cap unit 30 pushing the valve 25 as the cap unit 30 moves. In this event, the first sealing part is in a state before being sealed and thus remains open. Thereafter, the cap unit 30 is closed to set the first sealing part in a sealed state. Note that opening the first sealing part and the second sealing part at the same time means opening them substantially at the same time. If the second sealing part is opened as the first sealing part is opened, both are opened at the same time.

With the configuration described above, the first sealing part and the second sealing part are temporarily opened at the same time as the cap unit 30 is opened, and thus the inside of the ink storage container 200 is communicated with the atmosphere, making it possible to set the inner pressure of the ink storage container 200 equal to the outside pressure. This prevents ink from spouting out due to an increase in internal pressure of the ink storage container 200 as the cap unit 30 is opened to replenish the ink tank main body with ink from the ink storage container 200. Furthermore, overflow of ink from the ink tank main body can be suppressed. The inside of the ink storage container 200 is kept sealed by the second sealing part even if the cap unit 30 is opened. This makes it possible to prevent ink leakage even if the ink storage container 200 is turned upside down.

Figure 9A:
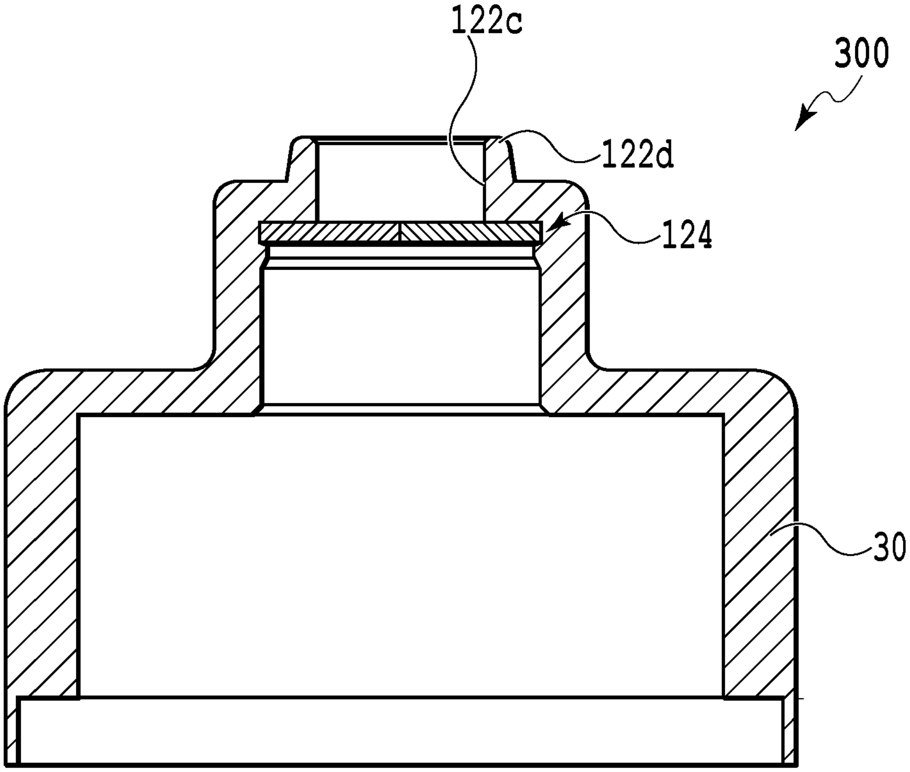
FIG. 9A is a cross-sectional view of an ink filling unit 20 of an ink storage container 300 provided with a slit valve as a valve mechanism.
Figure 9B:
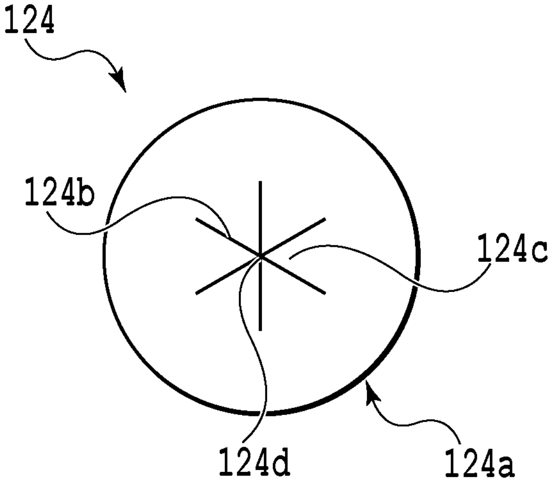
FIG. 9B is a plan view of the slit valve provided in the ink filling unit 20 shown in FIG. 9A.
Figure 10:
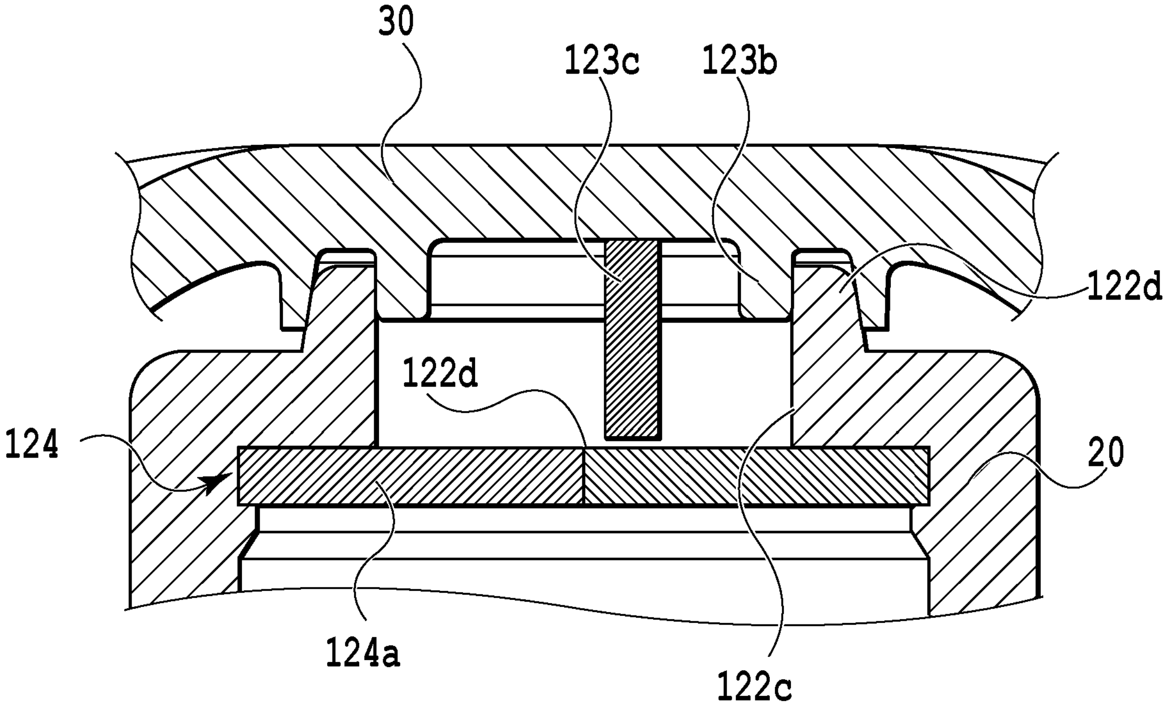
FIG. 10 is an enlarged cross-sectional view of the ink filling unit 20 and a cap unit 30 of the ink storage container 300.

FIG. 9 shows an ink storage container 300 equipped with a slit valve as a valve mechanism. FIG. 9A is a cross-sectional view of an ink filling unit 20 according to the present embodiment. FIG. 9B is a plan view of a slit valve provided in the ink filling unit 20 according to the present embodiment. FIG. 10 is an enlarged cross-sectional view of the ink filling unit 20 and a cap unit 30 according to the present embodiment.

The ink filling unit 20 has an filling port 122*c* for filling ink and a sealing part 122*d* made of an annular rib provided along the peripheral edge of the filling port 122*c*. The filling port 122*c* is provided with a slit valve 124 that opens and closes depending on the internal pressure of the ink storage container 300. The slit valve 124 has a valve body 124*a* made of a flexible material and three mutually intersecting slits 124*b* formed in the valve body 124*a*. The slit valve 124 can seal the filling port 122*c* in a closed state. The valve body 124*a* has six divided pieces 124*c* formed by the three slits 124*b*. Note that the number of slits 124*b* is not limited thereto and may be two or four or more. In this case, the plurality of slits 124*b* are preferably formed so as to have 2n-fold symmetry with respect to the center of the circular valve body 124*a* as shown in FIG. 9B, where n is the number of slits. The divided pieces 124*c* can thus be opened evenly, and the ink in the ink storage container 300 can be filled smoothly.

A cap sealing part 123*b* made of an annular rib and a protrusion 123*c* protruding toward the slit valve 124 are provided on the bottom surface of the cap unit 30 (the surface facing the filling port 122*c*). The cap sealing part 123*b* fits into the sealing part 122*d* as the cap unit 30 is attached to the ink filling unit 20, and thus functions as a sealing unit for sealing the filling port 122*c* together with the sealing part 122*d*. The protrusion 123*c* has its tip facing the valve body 124*a* of the slit valve 124 at a position away from an intersection point 124*d* of the plurality of slits 124*b* in a lateral direction (radial direction of the ink filling unit 20) with the filling port 122*c* sealed by the cap sealing part 123*b* and the sealing part 122*d*. With this configuration of the protrusion 123*c*, as will be described later, in a case when the internal pressure of the ink storage container 300 is higher than the external pressure as the cap unit 30 is opened, the internal pressure can be released. In the present embodiment, the protrusion 123*c* is provided integrally with the cap unit 30, but may be provided separately from the cap unit 30.

Figure 11A:
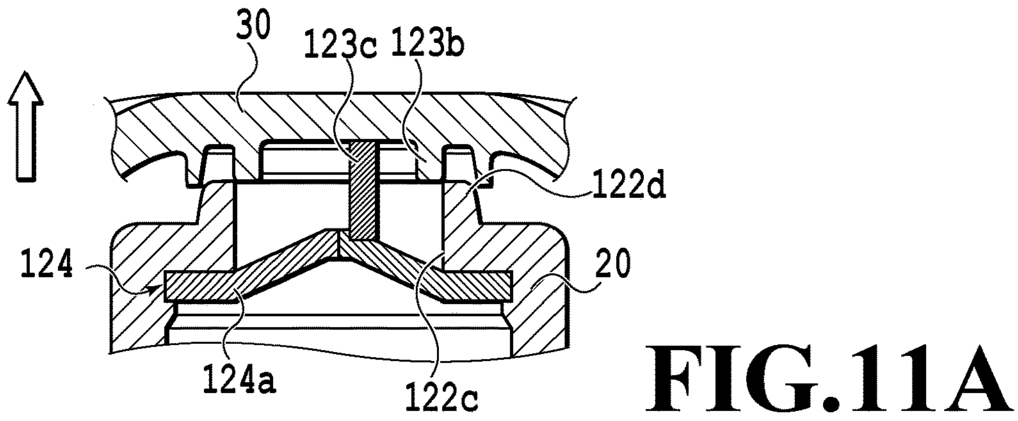
FIG. 11A is a cross-sectional view showing the relationship between the slit valve and a protrusion in a case of opening the cap.
Figure 11B:
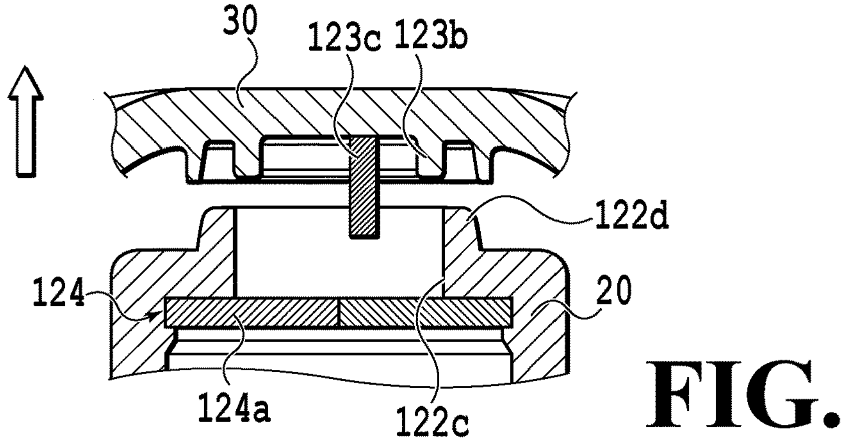
FIG. 11B is a cross-sectional view showing the relationship between the slit valve and the protrusion in a case of opening the cap.

FIGS. 11A and 11B are cross-sectional views showing the relationship between the slit valve and the protrusion in a case of opening the cap.

In a state where the cap unit 30 is attached to the ink filling unit 20 and the filling port 122*c* is sealed, the protrusion 123*c* faces the valve body 124*a* at the position laterally away from the intersection point 124*d* of the slit 124*b*, as described above, and the protrusion 123*c* is not in contact with the valve body 124*a*. Here, as the cap unit 30 starts to open (starts to move in the arrow direction), the fitting between the cap sealing part 123*b* and the sealing part 122*d* is released, and the sealing of the filling port 122*c* is released. In this event, if the internal pressure of the ink storage container 300 is higher than the external pressure, the valve body 24*a* of the slit valve 124 deforms by expanding outward due to the internal pressure of the ink storage container 300, as shown in FIG. 11A. In a case when the expanded valve body 124*a* comes into contact with the protrusion 123*c*, the slits 124*b* open to release the pressure inside the ink storage container 300, stopping the expansion of the valve body 124*a*. Thereafter, as the cap unit 30 is removed, the slits 124*b* are closed and the filling port 122*c* is sealed again, as shown in FIG. 11B. In a case of filling ink from the ink storage container 300 into the ink tank 2, the pressure difference between the inside and outside of the ink storage container 300 is eliminated, and the filling port 122*c* is in a sealed state. Therefore, the pressure required to open the slits 124*b* is prevented from acting on the slit valve 124 just by tilting the bottle main body, making it possible to prevent ink from leaking through the filling port 122*c*.

Figure 11C:
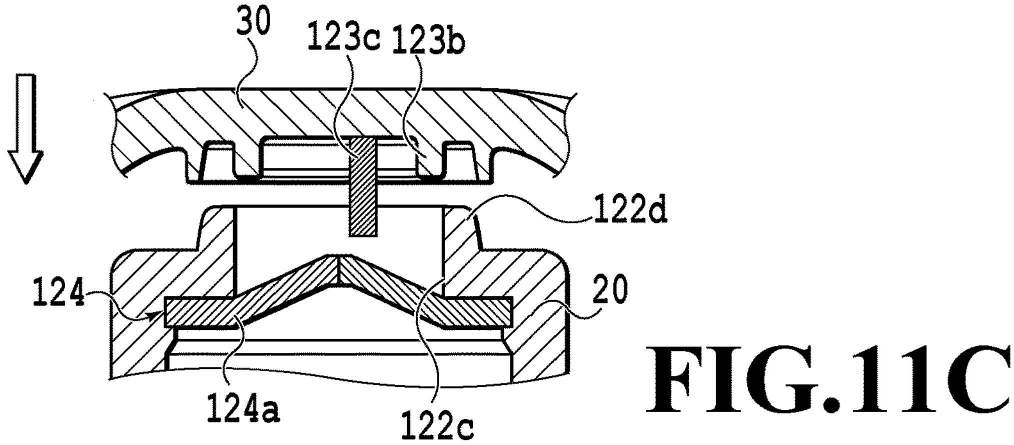
FIG. 11C is a cross-sectional view showing the relationship between the slit valve and the protrusion in a case of closing the cap.
Figure 11D:
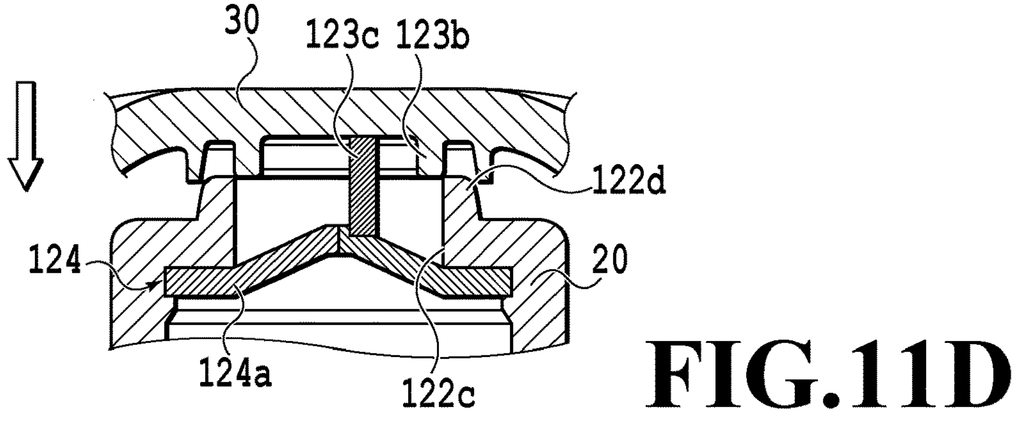
FIG. 11D is a cross-sectional view showing the relationship between the slit valve and the protrusion in a case of closing the cap.

FIGS. 11C and 11D are cross-sectional views showing the relationship between the slit valve and the protrusion in a case of closing the cap.

When the internal pressure of the ink storage container 300 increases in a state where the cap unit 30 is not attached to the ink filling unit 20, the valve body 124*a* of the slit valve 124 deforms by expanding outward, as shown in FIG. 11C. Here, as the cap unit 30 starts to be closed, the protrusion 123*c* comes into contact with the expanded valve body 124*a* before the cap sealing part 123*b* and the sealing part 122*d* are fitted together, as shown in FIG. 11D. As a result, the slits 124*b* open to release the pressure inside the ink storage container 300, stopping the expansion of the valve body 124*a*, and then the slits 124*b* are closed to seal the filling port 122*c*. As the cap unit 30 continues to be closed, the cap sealing part 123*b* and the sealing part 122*d* are fitted together to seal the filling port 122*c*. In this event, since the expansion of the valve body 124*a* is stopped, the protrusion 123*c* faces the valve body 124*a* at the position laterally away from the intersection point 124*d* of the slits 124*b*, and is not in contact with the valve body 124*a*.

With such a configuration, even if the internal pressure of the ink storage container 300 increases, the internal pressure can be released to the outside by bringing the protrusion 123*c* into contact with the slit valve 124 as the cap unit 30 is opened or closed. Note that the length of the protrusion 123*c* is not particularly limited, and can be set to an optimal length depending on the amount of actual deformation of the valve body 124*a* due to the increase in internal pressure of the ink storage container 300. Therefore, when the amount of deformation of the valve body 124*a* is relatively small, for example, the tip of the protrusion 123*c* may be in contact with the valve body 124*a* to the extent that it does not deform the valve body 124*a*, in a state where while the filling port 122*c* is sealed by the cap sealing part 123*b* and the sealing part 122*d*.

To simply bring the protrusion 123*c* into contact with the expanded valve body 124*a*, it is also conceivable to make the tip of the protrusion 123*c* face the intersection point 124*d* of the slits 124*b* in a state where the cap unit 30 is attached to the ink filling unit 20 (where the filling port 122*c* is sealed) as shown in FIG. 10. However, in this case, depending on the thinness of the protrusion 123*c*, the protrusion 123*c* may be inserted into a gap between the slits 124*b* near the intersection point 124*d* as the valve body 124*a* is expanded. The slits 124*b* can be kept closed even with the protrusion 123*c* thus inserted. As a result, even if the protrusion 123*c* comes into contact with the expanded valve body 124*a*, the pressure inside the ink storage container 300 may not be released. From this point of view, it is preferable that the tip of the protrusion 123*c* faces the valve body 124*a* of the slit valve 124 at the position laterally away from the intersection point 124*d* of the plurality of slits 124*b* with the filling port 122*c* sealed.

Figure 12A:
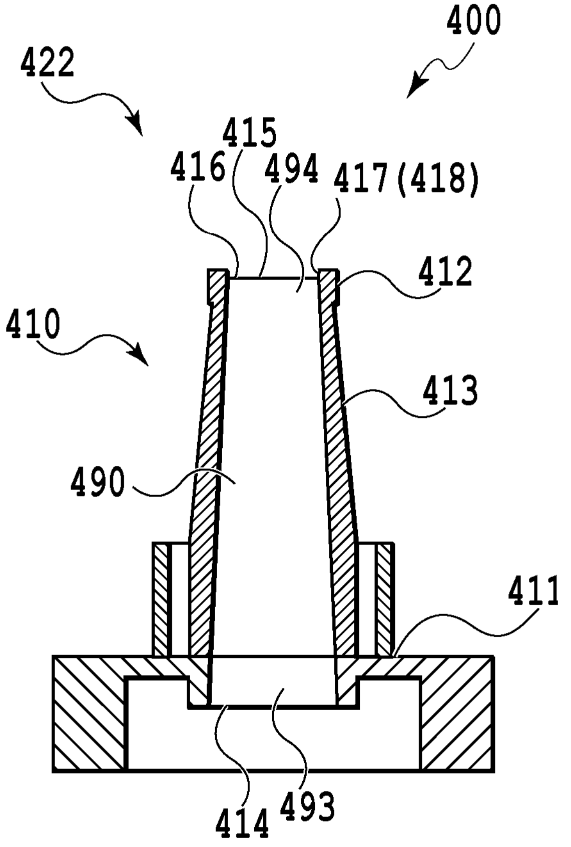
FIG. 12A is a cross-sectional view of an ink filling unit 420 of an ink storage container 400.

The ink filling unit 20 may have one channel or may have two channels. FIG. 12A is a cross-sectional view of an ink filling unit 420 of an ink storage container 400. As shown in FIG. 12A, a filling unit tip (nozzle) 410 protrudes from the outer surface of a bottom wall 411 of the ink filling unit 420 in a first direction 434. That is, with the ink filling unit 420 attached to an ink storage unit (not shown), the nozzle 410 protrudes in the first direction 434 from the ink storage unit through the ink filling unit 420. The nozzle 410 may protrude from the bottom wall 411 in a second direction 435 as well as in the first direction 434. In this case, the nozzle 410 is provided so as to penetrate the bottom wall 411.

The nozzle 410 has a roughly cylindrical shape. The nozzle 410 has an outer circumferential surface 412 with a circumferential cross section. An outer circumferential surface 413, which is a part of the outer circumferential surface 412, has a tapered shape and is inclined in a direction in which the diameter of the outer circumferential circle decreases from the bottom wall 411 toward the first direction 434. Such a shape enables smooth operation in a case of inserting the nozzle 410 into the tank sequentially from the distal end side away from the ink storage unit. However, the nozzle 410 may have the same outer circumferential diameter from the bottom wall 411 to the tip, and the outer circumferential surface thereof may extend in the vertical direction. Further, the shape of the nozzle 410 may be other than a cylindrical shape, for example, a quadrangular prism shape.

The nozzle 410 has a channel 490 through which ink or gas flows. The channel 490 passes through the ink filling unit 420 along the first direction 434. Although the channel 490 extends along the first direction 434, the channel 490 is not limited thereto and may be curved. The cross-sectional shape of the channel 490 may be circular or a shape other than the circular shape. In a state where the ink filling unit 420 is attached to the ink storage unit, one end of the channel 490 is communicated with the ink storage unit through an opening 493. The other end of the channel is communicated with the outside of the ink filling unit 420 through an opening 494 on the distal end side of the nozzle. The opening 493 has a circular shape. Note that the opening 493 may have a shape other than the circular shape. The opening 493 may be formed at a base end of the nozzle 410, and the position thereof is not limited to a base end face 414. The opening 494 is formed in a tip surface 415 that forms the end of the nozzle 410 facing in the first direction 434. The opening 494 has a circular shape. Note that the opening 494 may have a shape other than the circular shape.

Figure 12B:
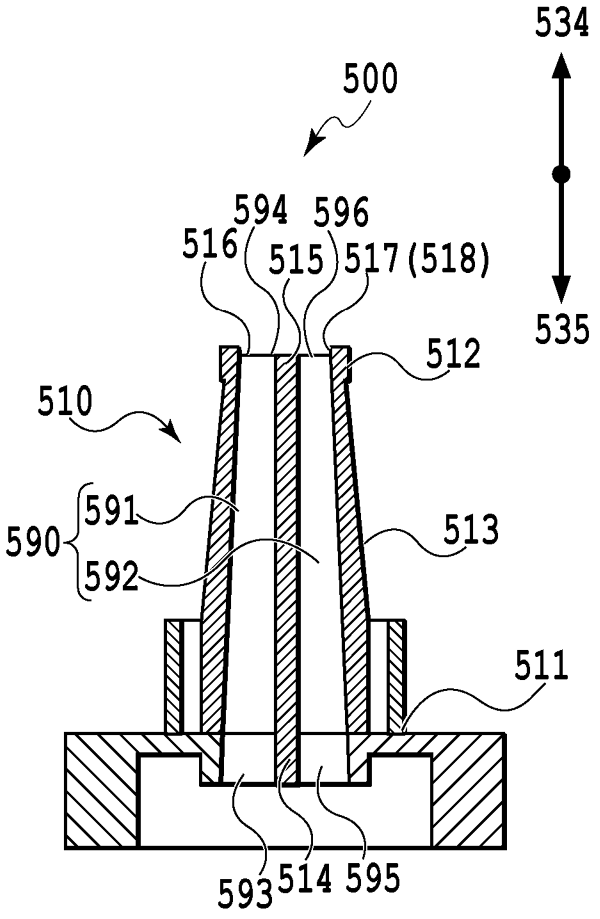
FIG. 12B is a cross-sectional view of an ink filling unit 520 of an ink storage container 500.

As shown in FIG. 12B, in another embodiment, a nozzle 510 of an ink storage container 500 may have two channels 590, a first channel 591 and a second channel 592. The first channel 591 and the second channel 592 may have the same length or different lengths along the ink flow direction. The first channel 591 and the second channel 592 may also have the same cross-sectional shape and cross-sectional area or different cross-sectional shapes and cross-sectional areas. The number of the channels 590 may be more than two. In a case where the nozzle 510 has more than one channel 590, the length and shape of each channel 590 may be the same or different. In a case when the nozzle 510 has two channels 590, openings 593 and 595 formed at the base end are formed on the same surface. However, these openings may be formed on different surfaces. A first opening 594 and a second opening 596 are formed in a tip surface 515 that forms the end of the nozzle 510 facing in a first direction 534. However, the first opening 594 and the second opening 596 may be formed at the tip of the nozzle 510, and the positions thereof are not limited to the tip surface 515. The first opening 594 and the second opening 596 have a circular shape. Note that the first opening 594 and the second opening 596 may have a shape other than the circular shape.

The tip of the nozzle 510 is, for example, a portion of the nozzle 510 that is formed of the tip surface 515 and an outer circumferential surface 512. The nozzle 510 has a recess 516 on the outer circumferential surface 512. The recess 516 is defined by the tip surface 515 and an inner circumferential surface 518 (one side surface) of an annular rib 517 protruding from the outer edge of the tip surface 515 in the first direction 534. That is, the tip surface 515 is recessed from the tip of the nozzle 510 (the tip of the annular rib 517). The inner circumferential surface 518 extends from the tip surface 515 toward the outer edge of the tip surface 515 in the first direction 534. In other words, the inner circumferential surface 518 extends in the first direction 534 while being inclined in a direction in which the diameter of the recess 516 increases. Note that the inner circumferential surface 518 may extend along the first direction 534 without being inclined. Further, the nozzle 510 does not need to have the recess 516. In other words, the tip of the nozzle 510 does not need to be recessed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An ink storage container comprising:

an ink storage unit that stores ink therein; and an ink filling unit communicated with the ink storage unit, wherein the ink storage unit is a region where surface free energy of its inner wall is lower than a surface tension of the ink, and the ink filling unit is a region where surface free energy of its inner wall portion that comes into contact with the ink in a case of pouring the ink from the ink storage unit is higher than the surface tension of the ink.

2. The ink storage container according to claim 1, wherein the ink is an ink for an ink jet printer, and the ink storage container is for injecting the ink into the ink jet printer.

3. The ink storage container according to claim 1, wherein a contact angle of the ink with respect to the inner wall of the ink storage unit is more than or equal to 70 degrees.

4. The ink storage container according to claim 1, wherein a contact angle of the ink with respect to the inner wall of the ink filling unit is less than or equal to 40 degrees.

5. The ink storage container according to claim 1, wherein the ink has a surface tension of 25 mN/m to 40 mN/m.

6. The ink storage container according to claim 1, wherein a haze value of a member included in the ink storage unit is less than or equal to 30%.

7. The ink storage container according to claim 1, wherein a material of the inner wall of the ink storage unit has a compound having a perfluoroalkyl group.

8. The ink storage container according to claim 1, wherein a difference between the surface free energy of the inner wall of the ink storage unit and the surface tension of the ink is greater than or equal to 5 mN/m.

* * * * *